Sept. 16, 1958     C. B. SPASE     2,852,116
FRICTION CLUTCH STRUCTURE
Filed May 2, 1955     4 Sheets-Sheet 1
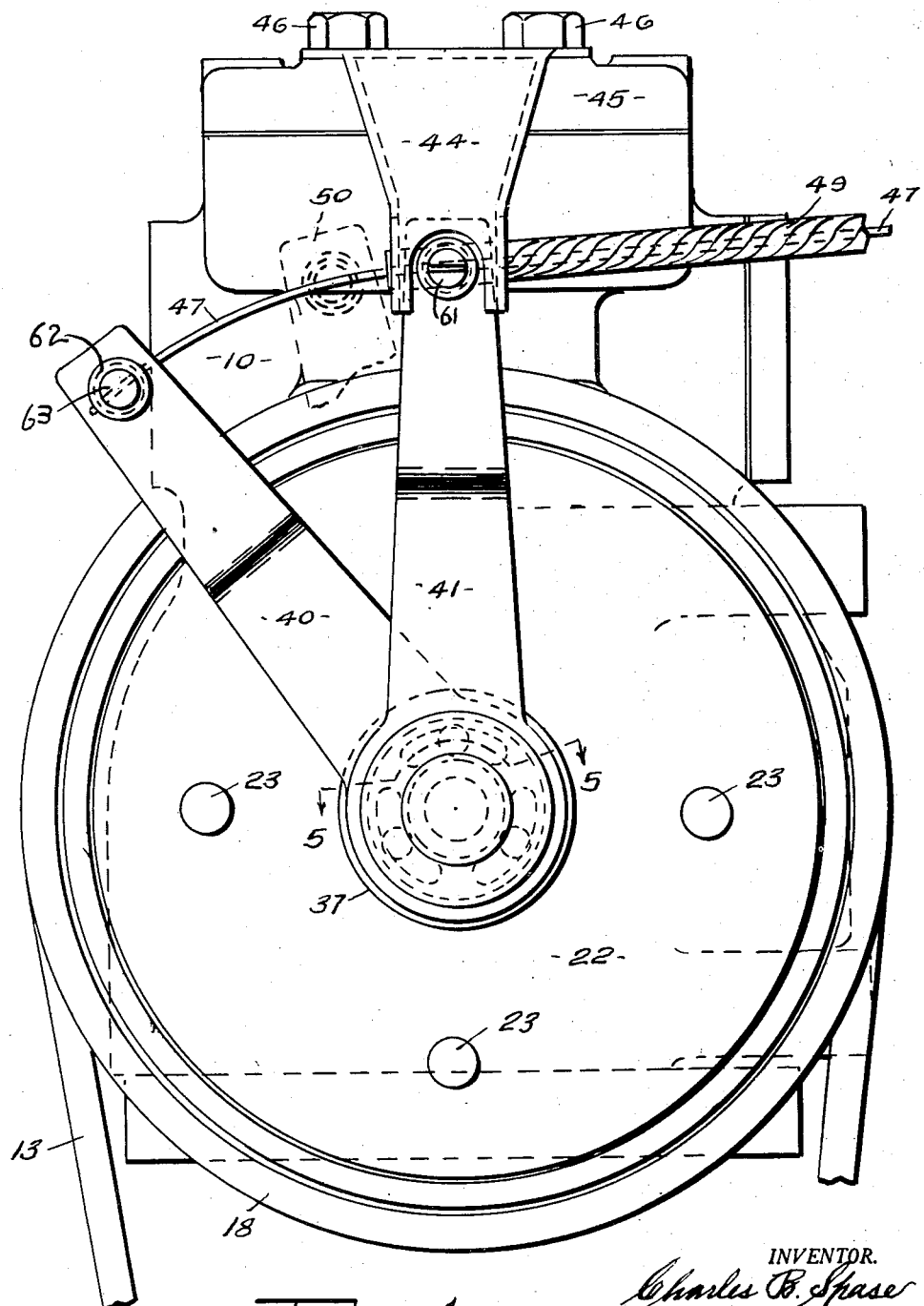
Fig-1-
INVENTOR.
Charles B. Spase
BY
D. Emmett Thompson
ATTORNEY.

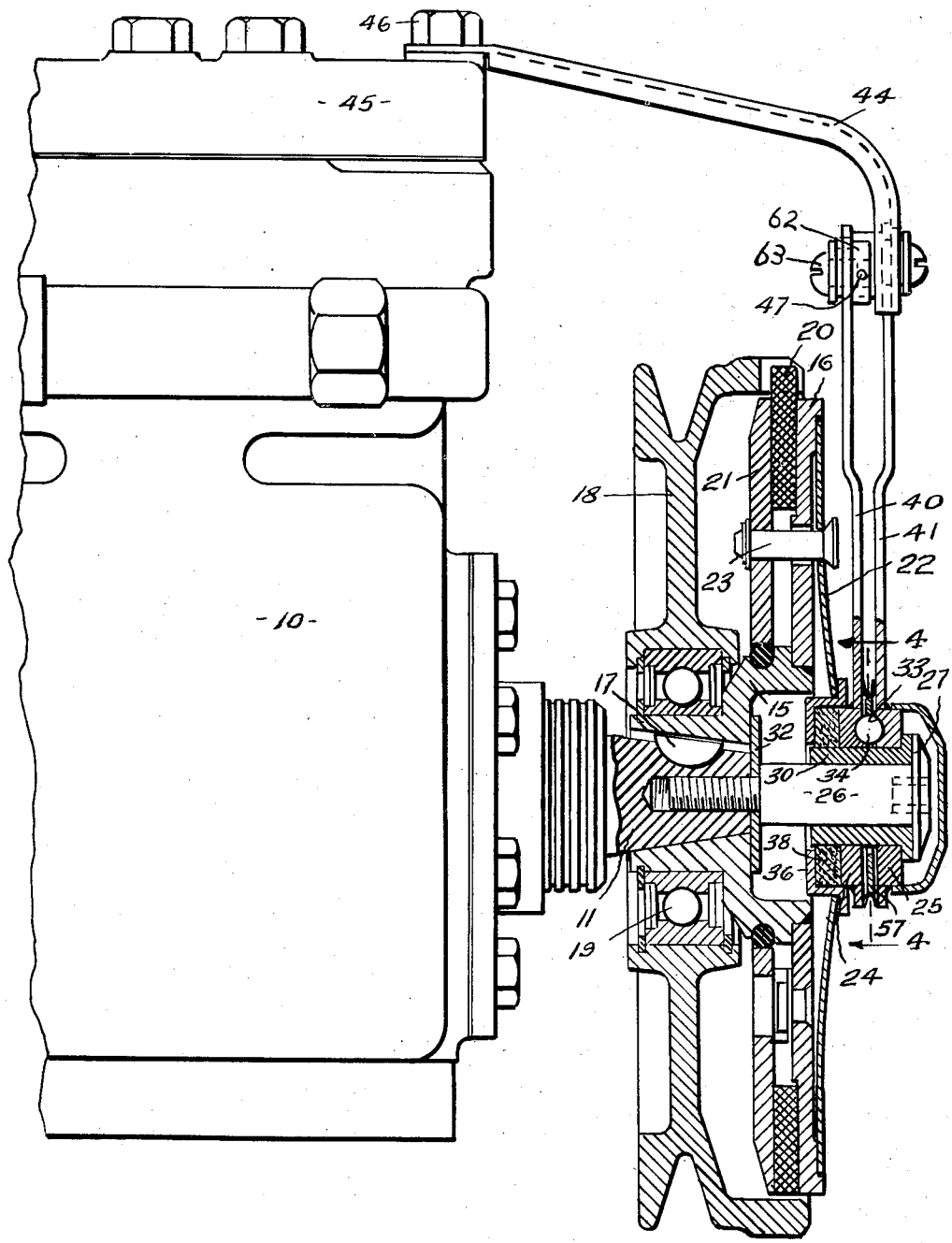

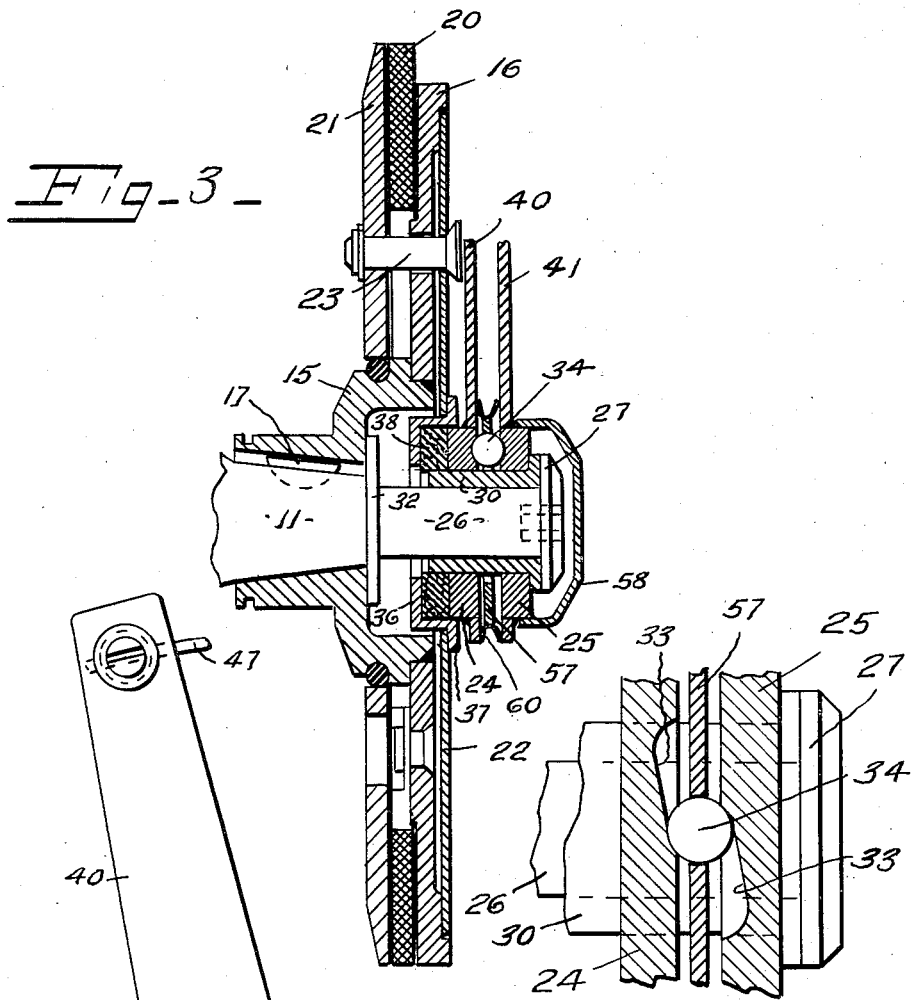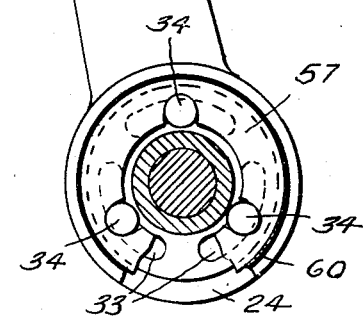

Sept. 16, 1958  C. B. SPASE  2,852,116
FRICTION CLUTCH STRUCTURE
Filed May 2, 1955  4 Sheets-Sheet 4
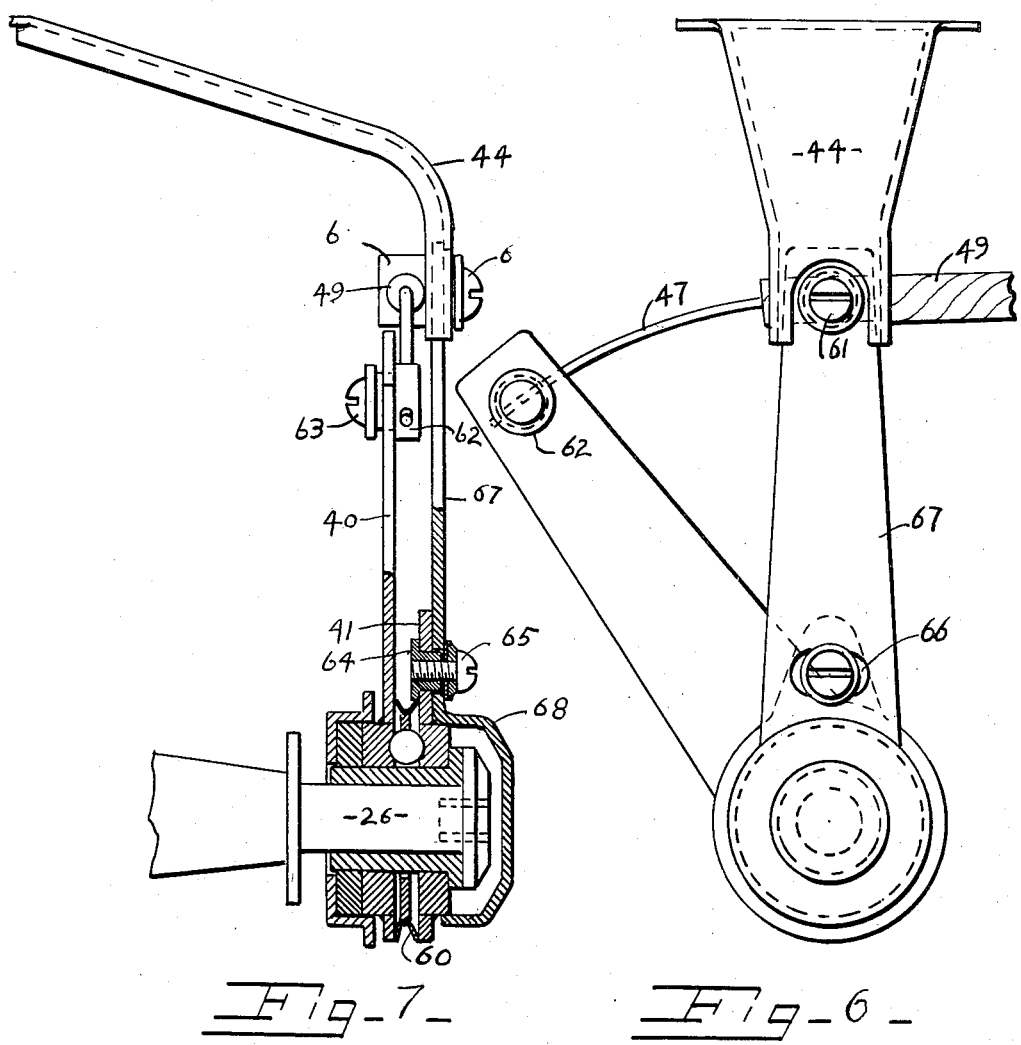
INVENTOR.
Charles B. Spase
BY
L. Emmett Thompson
ATTORNEY.

United States Patent Office 2,852,116
Patented Sept. 16, 1958

2,852,116

FRICTION CLUTCH STRUCTURE

Charles B. Spase, Nedrow, N. Y., assignor to Lipe-Rollway Corporation, Syracuse, N. Y., a corporation of New York Application May 2, 1955, Serial No. 505,358

2 Claims. (Cl. 192—89)

This invention relates to a friction clutch structure and more particularly to a friction clutch structure intended for association with a driven machine or mechanism.

The invention has as an object a friction clutch structure embodying an arrangement whereby the clutch is mounted on the end of the crank shaft, or other driven part of the machine, the clutch structure also embodying actuating mechanism which functions by the application of a slight amount of power to effect disengagement of the driving and driven members of the clutch.

The invention consists in the novel features and in the combinations and constructions hereinafter set forth and claimed.

In describing this invention, reference is had to the accompanying drawings in which like characters designate corresponding parts in all the views.

In the drawings—

Figure 1 is a front elevational view of a clutch structure embodying my invention.

Figure 2 is a vertical sectional view of the clutch structure shown in Figure 1.

Figure 3 is a vertical sectional view of the clutch structure illustrating the driving and driven members in disengaged position.

Figure 4 is a view taken on line 4—4 of Figure 2, with parts broken away.

Figure 5 is a view taken on line 5—5, Figure 1.

Figure 6 is a front elevational view of a modified form of the clutch actuating mechanism, and Figure 7 is a side elevational view of the structure shown in Figure 6, the lower portion thereof being in vertical section.

The clutch structure is illustrated in connection with the drive for a refrigerating compressor 10 on a motor vehicle. The clutch is mounted on the outer end portion of the compressor crank shaft 11. Compressors of this type are used extensively for air conditioning the interior of automobiles, the compressor being operated by a belt 13 driven by the crank shaft of the automobile engine.

These refrigerating compressors, like other automotive accessories, including oil pumps for power steering mechanisms, are mounted under the hood in the engine compartment of the automobile where room is at a premium. These compressors take from four to six horse power from the automobile engine and in periods when air conditioning is not required, it is desirable to have some conveniently operable means for disconnecting the drive between the automobile engine and the compressor. The clutch structure embodying this invention is intended particularly for such applications, the structure not occupying substantially any more room than the conventional belt pulley used on such accessories, and the structure embodies actuating mechanism which requires nominal effort on the part of the automobile operator to effect engagement and disengagement of the clutch.

The driven member of the clutch, consisting of a hub portion 15 and a disk portion 16, is fixedly mounted on the shaft end 11 by the key 17. The driving member consists of a pulley 18 mounted on the hub 15 of the driven member for free rotation on a ball bearing 19. The driving member 18 is provided with an annular driving plate 20. The driven member also includes an inner annular member 21. The members 16, 21 are normally maintained in clamping relation to the plate 20 by a resilient dished member 22. A series of pins 23 connect the member 22 with the driven disk 21. The member 22, through pins 23, serves to pull the disk 21 against the drive plate 20 and the latter against the disk 16. A clutch of this type is disclosed in my copending application, Ser. No. 404,025, filed January 14, 1954.

Actuating mechanism is provided for moving or shifting the central portion of the member 22 inwardly toward the driven member. This mechanism consists of inner and outer collars 24, 25, rotatably mounted on a cylindrical support 26 extending outwardly from the driven member. The outer end of the support is formed with a radial flange 27 providing a shoulder to restrain outward movement of the outer collar 25. In the structure shown, the collars 24, 25, are mounted on a bearing sleeve 30 positioned on the support 26 and having at its outer end a shoulder interposed between the outer collar 25 and the flange 27 of the support. In the embodiment shown, the support 26 is in the form of a stud, the inner end portion of which is threaded into the shaft end 11, the stud carrying a washer 32 serving to retain the driven member 15 on the shaft end.

The confronting sides of the collars 24, 25, are formed with complemental cam surfaces, here shown in the form of inclined arcuate extending grooves 33. These pairs of complemental cam surfaces are arranged in circumferentially spaced apart relation and are cooperable with rotatable members in the form of balls 34. Rotation of one of the collar members relative to the other effects axial movement of the inner collar 24 toward the driven member of the clutch. The resilient dished member 22 is formed with a central opening in which there is positioned a cup-shaped member 36 formed with a radial flange 37 engaging the member 22. Intermediate the cup-shaped member 36 and the inner collar 24, there is positioned an annular member 38 formed of friction material.

The collars 24, 25, are provided with radially extending arms 40, 41, respectively. One of these arms, such as arm 41, is fixed against rotation. This is accomplished by having the upper end of the arm 41 slidably mounted in a bracket 44 secured to the compressor head 45 as by cap screws 46. The depending portion of the bracket 44 is of channel formation, as shown in Figures 1 and 2. The upper end of the arm 41 is positioned in this channel structure and is accordingly restrained from rotation about the axis of the shaft 11 while being permitted to move radially of the support 26 in the event of any run out of the support due to manufacturing inaccuracies.

The arm 40, associated with the inner collar 24, is moved about the axis of the support 26 by actuating means in the nature of a push-pull wire 47 extending through a tubular cable 49 to the dash of the automobile, the wire end being provided with a suitable knob. This arrangement permits movement of the arm 40 from the full line position, Figure 1, to the dotted position at 50, and vice-versa, for the actuation of the clutch.

Referring to Figure 1, the pulley 18 is rotated in a clockwise direction and the arm 40 is moved into clutch engaging position, as shown in Figure 2. To disengage the clutch, the wire 47 is pulled to the right, effecting clockwise movement of the arm 40, this movement being in the same direction as the rotation of the driven clutch member. The friction washer 38 materially assists in the clockwise movement of the arm 40 whereby a nominal effort is required by the operator in disengaging the clutch. During this disengagement the balls 34 ride up the inclined cam surfaces 33, effecting the axial inward shifting of the collar 24. This inward movement of the central portion of the resilient disk 22 effects separation of the driven disks 16, 21, from the driving plate 20, as shown in Figure 3.

The balls 34 are maintained in proper circumferential spacing by an annular member 57 formed with notches to receive the balls, see Figure 4. The outer collar 25 is provided with a closure cap 58 to prevent the entrance of foreign matter between the collars and the support member 26. Also, an annular seal member 60, V-shaped in cross section, is positioned intermediate the collars encircling the ball retainer 57. This member 60 is formed of resilient sheet material, such as oil-proof plastic material, and serves to prevent the admission of dirt and foreign matter between the collars 24, 25.

The cable 49 is secured in a block 69 secured to the bracket 44 and arm 41 by a screw 61. The end of the wire 47 is fixed in a retaining block 62 secured to the arm 40, as by screw 63. In the arrangement shown in Figures 6 and 7, the arm 41 is foreshortened and apertured to receive a shouldered collar 64 threaded to receive screw 65 positioned in an arcuate slot 66 formed in an arm 67. The arm 67 is formed with a cup-shaped closure cap 68 similar to the cap 58, and the upper end of the arm is fixed to the bracket 44 in the same manner as the arm 41. With this arrangement, the foreshortened arm 41 may be adjusted about the axis of the support 26 to different angular positions within limits determined by the length of the slot 66. This not only provides for initial adjustment of the clutch actuating mechanism but provides adjustment necessitated by wear of the friction members of the clutch.

What I claim is:

1. A friction clutch structure comprising a driven member fixedly secured to the end of a shaft, a driving member mounted inwardly of said driven member for free rotation about the axis of said shaft, a dished member of resilient material positioned at the outer side of said driven member for maintaining said driving and driven members in engagement, the central portion of said dished member being shiftable axially of the clutch structure toward the same for permitting disengagement of said driving and driven members, said dished member being formed with a central aperture, said shaft having an extension extending outwardly therefrom through said aperture, a pair of collars mounted on said extension, said extension being formed at its outer end with a shoulder engageable by the first of said collars to restrain the same from outward axial movement, said first collar having a radially extending arm fixed against rotation about the axis of said shaft, an annular retaining member carrying a circular series of rotatable members positioned between said collars, the confronting sides of said collars being formed with complemental cam surfaces engaging said rotatable members and being cooperable therewith upon rotation of said second collar member to effect axial movement of said second collar inwardly towards said dished member, an annular member formed of friction material positioned on said extension intermediate said second collar and said dished member, and means operatively connected to said second collar to effect rotation thereof.

2. A friction clutch structure having driving and driven members, said driven member comprising a hub portion fixedly secured to the end of a shaft, a driven disk fixedly secured to said hub at the outer end thereof, an axially shiftable driven disk mounted on said hub inwardly from said fixed disk, a driving member journalled for free rotation on said hub and being disposed inwardly of said disks, a dished-shaped resilient member disposed with its convex side confronting the outer surface of said fixedly secured driven disk and with the peripheral portion of said member engaging said fixedly secured driven disk, a plurality of pins extending through said driven disks and said dished member and being cooperable with the latter to urge said inner driven disks outwardly toward said fixedly secured driven disk, said driving member having an annular portion disposed between said driven disks whereby said clutch is normally in engaged position, said shaft having an extension extending outwardly therefrom through said dished shaped member, a pair of collars mounted on said extension and said extension being formed at its outer end with a shoulder for restraining axial movement of said collars in a direction away from said clutch structure, an annular retaining member disposed between said collars and carrying a circular series of rotatable members, the confronting sides of said collars being formed with complemental cam surfaces engaging said rotatable members and being cooperable therewith upon rotation of one of said collars relative to the other to effect axial movement of the central portion of said dished member toward the clutch structure to permit disengagement of said driving and driven members, an annular member formed of friction material positioned on said extension intermediate said collars and the central portion of said dished shaped member, one of said collars having a radially extending arm secured against rotation about the axis of said shaft, and means operatively connected to said other collar to effect rotation thereof.

References Cited in the file of this patent

UNITED STATES PATENTS

| | | |
|---|---|---|
| 203,808 | Williamson | May 14, 1878 |
| 1,010,366 | Herndon | Nov. 28, 1911 |
| 1,963,364 | Hazelton et al. | June 19, 1934 |
| 2,144,024 | La Brie | Jan. 17, 1939 |
| 2,485,741 | King | Oct. 25, 1949 |
| 2,714,437 | Spase | Aug. 2, 1955 |
| 2,771,977 | Uher | Nov. 27, 1956 |